United States Patent [19]

Fourrey et al.

[11] Patent Number: 4,930,736
[45] Date of Patent: Jun. 5, 1990

[54] LOCKING DEVICE FOR THE GUIDING SLIDE OF A VEHICLE SEAT OR THE LIKE

[75] Inventors: Francois Fourrey, Montbeliard; Serge Deley, Seloncourt; Jean M. Coussemacq, Valentigney, all of France

[73] Assignee: ECIA - Equipements et Composants Pour l'Industrie Automobile, Audincourt, France

[21] Appl. No.: 349,271

[22] Filed: May 9, 1989

[30] Foreign Application Priority Data

May 19, 1988 [FR] France ................ 88 06730

[51] Int. Cl.$^5$ .............................................. F16M 13/00
[52] U.S. Cl. ..................... 248/430; 296/65.1; 297/341
[58] Field of Search ............... 248/429, 430, 424, 420; 297/341; 296/65.1

[56] References Cited

U.S. PATENT DOCUMENTS

| | | | |
|---|---|---|---|
| 4,455,009 | 6/1984 | Foster et al. | 248/430 X |
| 4,508,385 | 4/1985 | Bowman | 297/341 |
| 4,563,044 | 1/1986 | Rees | 296/65.1 X |
| 4,639,038 | 1/1987 | Heling | 297/341 |
| 4,648,657 | 3/1987 | Cox et al. | 297/341 |
| 4,652,052 | 3/1987 | Hessler et al. | 248/430 X |
| 4,666,208 | 5/1987 | Tatematsu et al. | 297/341 |
| 4,707,030 | 11/1987 | Harding | 248/430 X |
| 4,733,845 | 3/1988 | Maiwald | 248/429 |
| 4,781,354 | 11/1988 | Nihei et al. | 248/430 X |
| 4,813,643 | 3/1989 | Nihei | 248/430 |

FOREIGN PATENT DOCUMENTS

| | | |
|---|---|---|
| 2371313 | 6/1978 | France . |
| 2376009 | 7/1978 | France . |
| 2033738 | 5/1980 | United Kingdom . |

*Primary Examiner*—Ramon O. Ramirez
*Attorney, Agent, or Firm*—Sughrue, Mion, Zinn, Macpeak & Seas

[57] ABSTRACT

A locking bolt (14) is slidably mounted in the external element (1) of the slide. It has side teeth (16) cooperating with holes in this external element and, at its end removed from these teeth, a hole (28) for receiving an actuating pin (32) which also passes through the internal element (2) of the slide. The cross-section of the pin (32) complements the hole of the bolt such that rotation of the pin about itself causes locking. The pin is movable axially and may be disengaged from the bolt so as to allow momentary relative axial displacement of the internal element and return into the previous position indicated by the bolt.

8 Claims, 2 Drawing Sheets

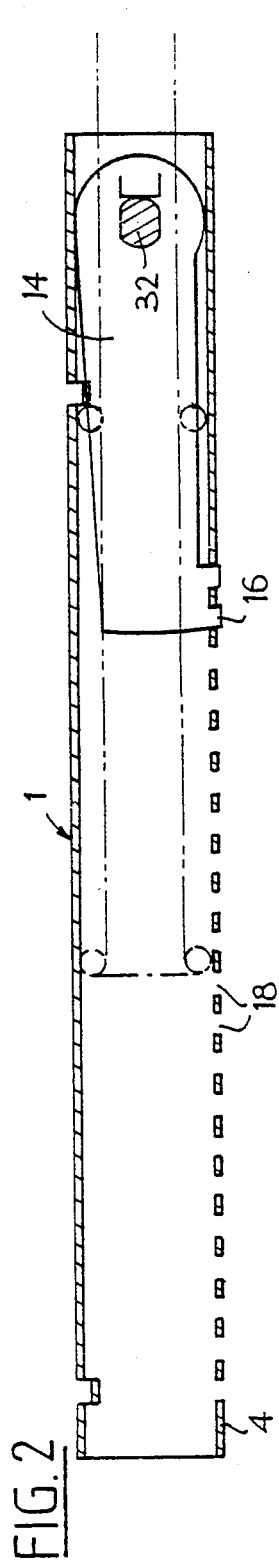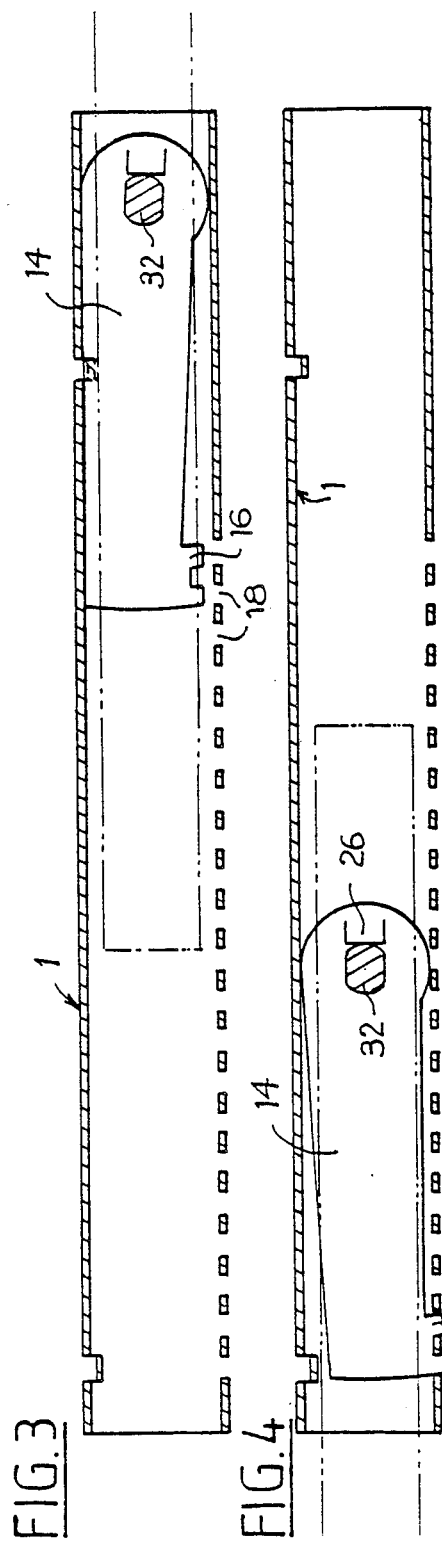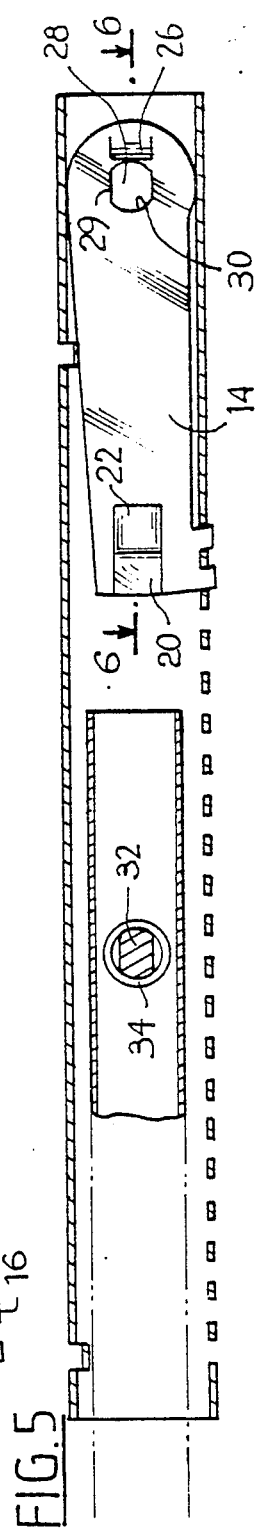

LOCKING DEVICE FOR THE GUIDING SLIDE OF A VEHICLE SEAT OR THE LIKE

BACKGROUND OF THE INVENTION

The present invention relates to the seats of motor vehicles or the like, the translational movement of which may be adjusted, and in particular to the front seats of motor vehicles with two doors.

In fact, on these front seats, the device for adjusting the translational movement is used not only to ensure the comfort of the user, allowing him/her to position the seat at the desired distance from the dashboard, but also to increase the space available at the rear of the vehicle after the backrest has been swung down.

It is extremely inconvenient for the user, for example the driver of a vehicle, to have to adjust again his/her seat each time he/she leaves it in order to allow access to the rear of the vehicle. It has been proposed to provide the seat guiding slides next to the locking device enabling the slide to be fixed in the desired position, with a system for locating the position of the seat, which acts as a memory. However, the known locating systems are generally complex and moreover they are added to the locking device outside the slide such that the assembly has large and often prohibitive dimensions.

SUMMARY OF THE INVENTION

The object of the present invention is to overcome these drawbacks by providing a device which allows both the seat to be fixed in its adjustment position and this position to be relocated after momentary displacement.

The present invention thus relates to a locking device for the guiding slide of a vehicle seat, or the like, comprising an external generally U-shaped element surrounding at least partially an internal element, and a locking bolt cooperating with holes or notches in the external element, in which the bolt is slidably mounted inside the external element and is joined to the internal element by a pin causing it to pivot, which pin is capable of being displaced axially relative to these two members, between a position where the bolt is actuated and a position where the bolt locked in the adjustment position is separated, allowing momentary relative displacement of the internal and external elements from and towards this adjustment position.

In such a device, the bolt acts both as a member for fixing the two elements of the slide relative to each other, and also as a memory enabling the chosen adjustment position to be relocated after momentary displacement of the seat forwards. This device thus comprises an extremely small number of parts and is, moreover, entirely contained inside the slide.

According to a preferred embodiment, the actuating pin has a non-circular cross-section which complements that of a hole of the bolt and is inscribed inside the circular cross-section of a through-passage of the internal member.

Moreover, the pin causing pivoting of the bolt is pushed back elastically towards the latter and is joined to a device for causing rotation and axial displacement thereof.

The description below of an embodiment, given by way of a non-limiting example and shown in the accompanying drawings, will illustrate more clearly, moreover, the advantages and characteristics of the invention. In these drawings:

BRIEF DESCRIPTION OF THE DRAWINGS

FIGS. 2, 3 and 4 are diagrammatic views, sectioned along the line 2—2 of FIG. 1, showing the locking member in three different positions.

FIG. 5 is a diagrammatic view, sectioned along the line 5—5 of FIG. 1, showing the slide and the locking device in the momentarily displaced position.

DETAILED DESCRIPTION OF A PREFERRED EMBODIMENT

Figure 1:
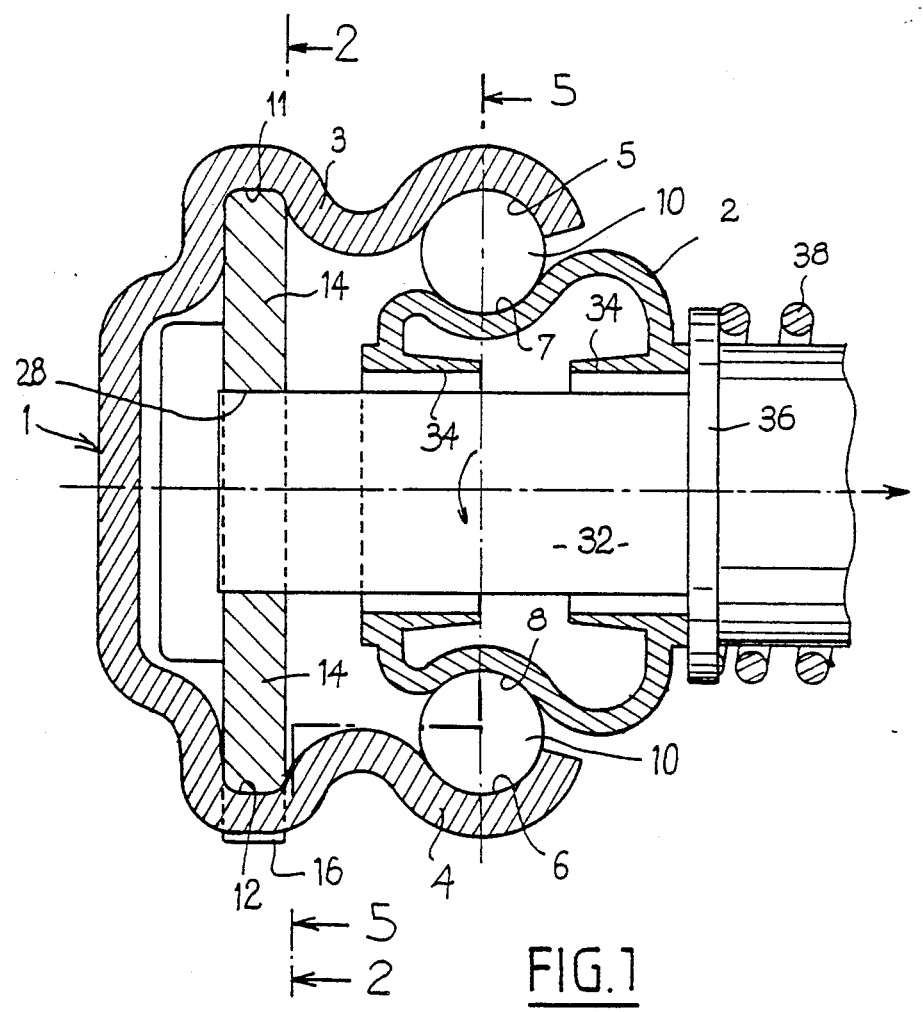
FIG. 1 is a cross-sectional view of a slide provided with a locking device according to the invention, in a vertical plane passing through the operating pin.

The guiding slide of a vehicle seat, shown in FIG. 1, comprises in the usual manner an external generally U-shaped element which cooperates with an internal element 2 so as to allow relative axial displacement of the said elements.

In the embodiment shown, the arms 3 and 4 of the external element 1 are curved at their ends so as to define two internal longitudinal grooves, 5 and 6 respectively, which open towards each other. Similarly the internal element 2 has external side walls curved so as to form external longitudinal grooves 7 and 8, respectively, which cooperate with the grooves 5 and 6 of the external element 1 so as to receive the balls 10.

One of these elements, for example the external element 1, is fixed to the floor of the vehicle while the other one, the internal element 2, is integral with the seat of the vehicle. In this latter case, the internal element 2 preferably has a tubular cross-section and is made directly by deformation of the base reinforcement tube of the seat.

The external element 1 has, moreover, in its two opposite side walls, 3 and 4 respectively, two facing slots 11 and 12 inside which a locking bolt 14 is slidably mounted.

Figure 6:
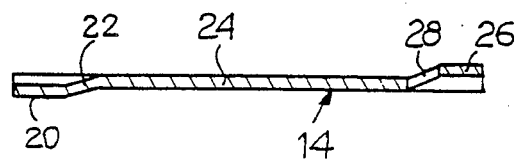
FIG. 6 is a sectioned view of the bolt along the line 6—6 of FIG. 5.

The bolt 14 is an elongated element with a flat general shape which narrows from one end to the other and has at its narrowest end side teeth 16 cooperating with notches or holes 18 formed in the wall 4 of the external element 1 (FIG. 2). At right angles to these teeth 16, the bolt 14 has a boss 20 which is joined by an inclined ramp 22 to its flat main part 24. A second boss 26, higher than the boss 20, is also provided at the opposite end of the bolt 14, but projects on the opposite side of the bolt, and the inclined part which joins the flat part 24 has a hole 28 (FIG. 6).

The hole 28 of the bolt 14 is defined by two opposite flat surfaces 29 separated by two cylinder portions 30, as FIG. 5 shows in more detail. Into this hole there engages the end of an actuating pin 32 having a cross-section with a shape complementing that of the hole 28. Pin 32, cylinder portions 30, surfaces 29 and hole 28 form a clutch means for disconnectably joining pin 32 to bolt 14, as will be described below in more detail.

The pin 32 is long enough to pass not only through the bolt 14 but also through the internal element 2 inside which it is guided by bearings with a circular cross-section formed in the tube 2 by mounted bushes or preferably by flow drilling.

Outside this internal element 2, the pin 32 is provided with a collar 36 against which there bears one of the ends of a helical spring 38, the opposite end of which is pressed against a fixed member of the seat, a member which has not been shown so as not to complicate the figure.

Similarly the pin 32 is joined at its opposite end to the bolt 14, to an operating device which may be of any suitable type and for this reason has not been shown.

The operating device has a member enabling the pin 32 to be pivoted about itself and, consequently, the bolt 14 to be pivoted inside the external element 1. During this pivoting movement, the bolt 14 thus passes from the locking position shown in FIG. 2, a position where the teeth 16 are firmly engaged in the holes 18 of the external element 1, to an unlocked position, such as that shown in FIG. 3, where the teeth 16 are disengaged from the holes 18 and the bolt 14 is free to slide inside the external element 1.

Since the cross-section of the pin 32 is inscribed inside the circular cross-section of the passage defined by the bearings 34, rotation of this pin does not alter the position of the internal element 2. On the other hand, since the bolt 14 is free, the seat integral with the internal element 2 may be pushed so as to cause sliding of this internal element inside the external element 1 on the balls 10. This translational displacement causes the movement also, of course, of the pin 32 as well as the bolt 14 which slides inside the external element 1. The entire locking device thus moves together with the seat until the latter reaches the desired adjustment position. At this point, pivoting of the pin 32 in the opposite direction repositions the bolt 14 in the locked position, i.e. with the teeth 16 in the holes 18, as shown in FIG. 4.

The user of the seat can thus move the latter relative to the dashboard and position it at the distance which is most comfortable for him/her.

The device for operating the pin 32 also has means for displacing this pin axially relative to the bolt 14 and to the bearings 34. This axial displacement enables the end of the pin 32 to be disengaged from the hole 28 of the bolt 14 and thus make these two members independent. At this point, a translational movement of the seat and of the internal member 2 causes the pin 32 to move as above, but does not affect the bolt 14 which remains in the locked position, i.e. in the adjustment position which has been previously chosen by the user.

The seat, i.e. the internal member 2, can thus be pushed to the front end of the slide, freeing maximum space for access at the rear without the bolt 14 being displaced. On the other hand, when this access space is no longer required and the seat is then pushed backwards into the vicinity of the bolt 14, the pin 32 pushed back by the spring 38 penetrates into the cavity defined by the boss 20 and comes into contact with the ramp 22 of the bolt 14 which guides it and centres it relative to this bolt. Continuing to move, the pin 22 slides on the central part 24 of the bolt 14 and then comes up against the boss 26, which stops it. Acted on by the spring 38, the pin 32 then enters into the hole 28 and resumes its position where it engages the bolt 14 and longitudinally fixes the internal element 2 relative to the latter. Since the bolt 14 has remained in the adjustment position chosen by the user, the seat automatically returns into this adjustment position without the user having to intervene.

The bolt 14 has thus acted as a memory, enabling the previous adjustment position to be reliably and automatically relocated.

By thus using the same member for the two functions and placing this member inside the slide, a device is obtained, with limited dimensions and a very small number of parts, which effectively ensures both locking and relocation of the adjustment position.

Of course, the slide may be arranged vertically as shown in FIG. 1 or, on the contrary, be positioned horizontally, a spring or other recall member preferably bringing back the bolt 14 automatically into its locking position.

Similarly, it can be clearly seen that the internal element may be the fixed element, while the external element is fixed to the seat of the vehicle without thereby modifying the design or operation of the device.

What is claimed is:

1. Locking device for the guiding slide of an adjustable vehicle seat to be mounted on a floor, comprising:
   an external generally U-shaped elongated element (1) with holes or notches (18) along its length;
   an internal elongated element (2) slidingly supported in said external element (1);
   a locking bolt (14) cooperating with said notches (18) and slidingly and pivotally mounted inside said external element (1) for movement between a locked position and an unlocked position to adjust the seat position;
   clutch means; and
   an actuating pin (32) transversely mounted in said internal element (2) to be translationally and rotatively movable and disconnectably joined to said locking bolt (14) by said clutch means (28, 29, 30; 32);
   wherein said actuating pin (32) is movable between a first position, where said clutch means is engaged so that the actuating pin (32) can be rotated to pivot said locking bolt (14) between its locked and unlocked positions, and a second position where said clutch means is disengaged so that the locking bolt (14) is in its locked position, said external and internal elements (1, 2) being momentarily relatively movable.

2. Locking device for the guiding slide of a vehicle seat, or the like, comprising an external generally U-shaped element (1) surrounding at least partially an internal element (2) and a locking bolt (14) cooperating with holes or notches (18) in the external element (1), characterized in that the bolt (14) is slidably mounted inside the external element (1) and is joined to the internal element (2) by an actuating pin (32) causing it to pivot, which pin is capable of being translationally displaced axially relative to these two members between a position where the bolt is made to pivot and a position where the bolt locked in an adjustment position is separated, allowing momentary relative displacement of the internal and external elements from and towards this adjustment position; in that the actuating pin (32) is pushed back elastically towards the bolt (14); in that the bolt (14) is a substantially flat elongated member which is provided with teeth (16) projecting laterally at one of its ends and with a hole (28) for receiving the actuating pin at its opposite end; and in that the bolt (14) has a boss (26) forming a shoulder stopping the translational movement of the actuating pin (32), between the hole (28) and its end edge removed from the teeth (16).

3. Device according to claim 1 or 2, characterized in that the actuating pin (32) has a non-circular cross-section which complements that of a hole (28) of the bolt

(14) and is inscribed inside the circular cross-section of a through-passage (34) of the internal member (2).

4. Device according to claim 1, characterized in that the actuating pin (32) is pushed back elastically towards the bolt (14).

5. Device according to claim 4, characterized in that the bolt (14) is a substantially flat elongated member which is provided with teeth (16) projecting laterally at one of its ends and with a hole (28) for receiving the actuating pin at its opposite end.

6. Device according to claim 5, characterized in that the bolt (14) has a boss (26) forming a shoulder stopping the translational movement of the actuating pin (32), between the hole (28) and its end edge removed from the teeth (16).

7. Device according to claim 5 or 2, characterized in that the bolt forms in the vicinity of the teeth (16), a boss (20) in the opposite direction to the stopping shoulder (26) and a ramp for guiding the actuating pin (32).

8. Device according to claim 4 or 2, characterized in that the bolt (14) is recalled elastically towards the locking position.

* * * * *